United States Patent [19]

Spane

[11] 4,285,300

[45] Aug. 25, 1981

[54] ANIMAL FEEDING SYSTEM

[76] Inventor: Victor L. Spane, 27004 - 64th NW., Stanwood, Wash. 98292

[21] Appl. No.: 95,583

[22] Filed: Nov. 19, 1979

[51] Int. Cl.³ .............................................. A01K 5/00
[52] U.S. Cl. ...................................... 119/58; 119/60
[58] Field of Search ........................ 119/58, 59, 60, 16

[56] References Cited

U.S. PATENT DOCUMENTS

| | | | |
|---|---|---|---|
| 457,806 | 8/1891 | York | 119/27 |
| 596,804 | 1/1898 | Busch | 119/58 |
| 2,500,889 | 3/1950 | Winkler | 119/58 |
| 2,686,494 | 8/1954 | Garman | 119/58 |

FOREIGN PATENT DOCUMENTS 23240  1/1883  Fed. Rep. of Germany ............ 119/58

*Primary Examiner*—Hugh R. Chamblee
*Attorney, Agent, or Firm*—Ford E. Smith; David L. Garrison

[57] ABSTRACT

An animal feeding system employs an openwork manger suspended in such manner as to cause a feeding animal to raise its head in grasping hay between opening of the manger and upon pulling tending to tear hay flakes and bunches apart. Means is provided to discourage animal penetration to beneath the manger thus precluding fouling of that area and possible animal bunching in restricted space.

1 Claim, 5 Drawing Figures

ANIMAL FEEDING SYSTEM

SUMMARY OF THE INVENTION

This invention is concerned with the feeding of cattle, horses and other hay consuming animals. At a hay feeding station an elevated, openwork manger for hay is accessible to the animals from beneath whereby they are caused to pull out and tear apart hay placed in tight units in the container. Preferably, the manger at the feeding station is sheltered from the elements and means is desirably provided to discourage feeding animals from crowding under the manger and possibly fouling the underlying area or space.

DETAILED DESCRIPTION OF THE DRAWINGS

Figure 3:
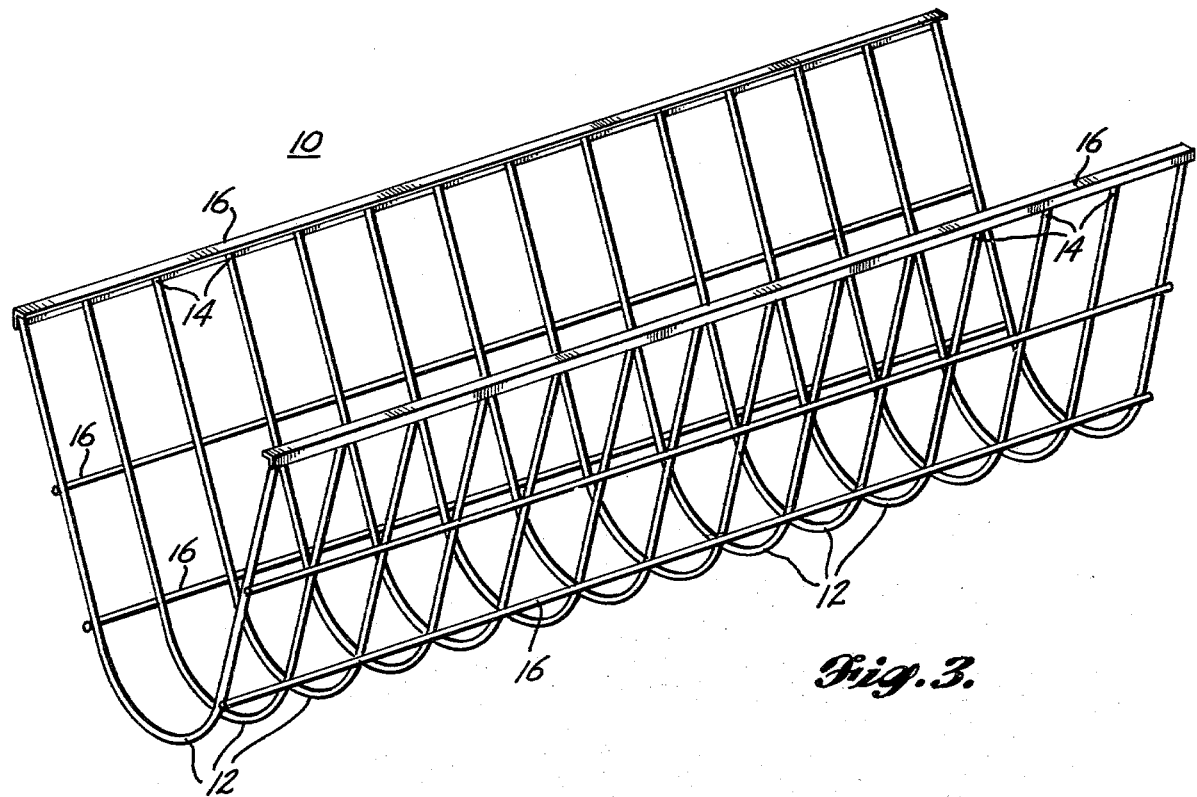
FIG. 3 is a perspective view of a manger as used in this invention.
Figure 5:
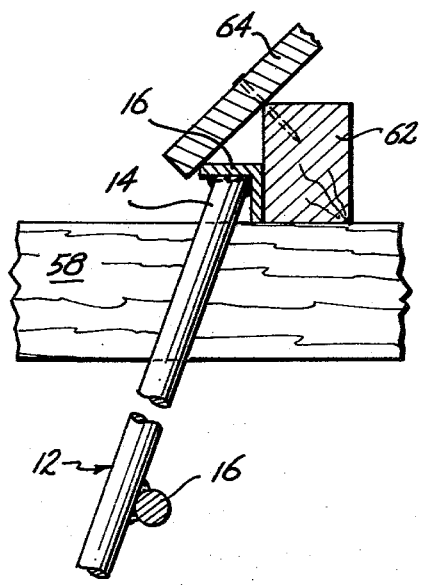
FIG. 5 is an enlarged view in cross-section showing typical mounting for the manger edge.

Referring to FIG. 3, wherein is shown an upwardly open, openwork manger 10, a plurality of U-shaped bar-like members 12 is assembled in longitudinal alignment with their ends 14 secured as by welding to rim bars 16. Tie bars 18, likewise welded to members 12 so that they are uniformly spaced-apart. Such spacing is normally of such dimension as to accommodate the nose or snout of the animal intended to be accommodated by the manger. As shown in FIG. 5, rim bars 16 may be angle-irons.

Usually for feeding cattle, the manger is about three feet deep from its upper mouth to the bottom of the U-shaped members. The length of the manger is determined by the numbers of animals to use the feeder. For convenience of handling and installation, modular manger units will be about eight or ten feet long.

Figure 1:
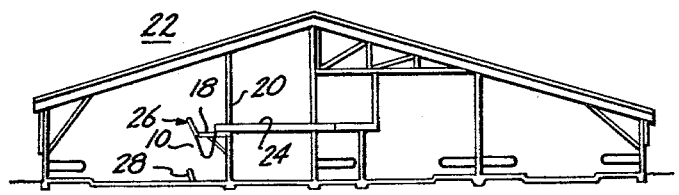
FIG. 1 is a schematic cross-sectional view of a barn equipped with a manger of this invention.

In the installation of FIG. 1, the manger 10 is suspended from bracket arm 18 mounted on post 20 of the barn structure designated as a whole by numeral 22 down the central portion of which it extends, usually the full length of the barn. A hay storage mow 24 is located close to one side of manger 10 and a fender 26 extends along its other side. Curb 28 at the ground or floor level of the barn discourages feeding animals from crowding beneath the manger. It also reduces or prevents fouling of the area beneath the manager.

When animals are to be fed, hay from bales is placed along the length of the manger. Usually when the wires are removed from baled hay, the bale comes apart in compressed flakes or bunches eight to twelve inches thick. These are what the feeding attendant places in the manger largely intact. With this manger it is left to the animals to pull the flakes or bunches apart. They do this by inserting their noses and mouths into the manger between the spaced-apart members 12 and gripping and pulling on some of the hay. Some they retain and chew but some inevitably falls to the area beneath the manger. This fallen hay will be cleaned up in due course by the animals as they continue feeding. The tie bars facilitate the dismantling of the flakes or bunches of hay by interferring with the ease with which the animals can pull hay out of the manger. It is customary to suspend the manger at such height that an animal must raise his head and nose to get into the manger to feed.

When an attendant is drawing stored hay out of that on mow 24, he rapidly cuts the bale bindings and shoves or kicks the bale portions into the manger. The fender 26 serves to prevent such hay from going over the manger side and falling to usually fouled floor or ground outside curb 28.

Figure 2:
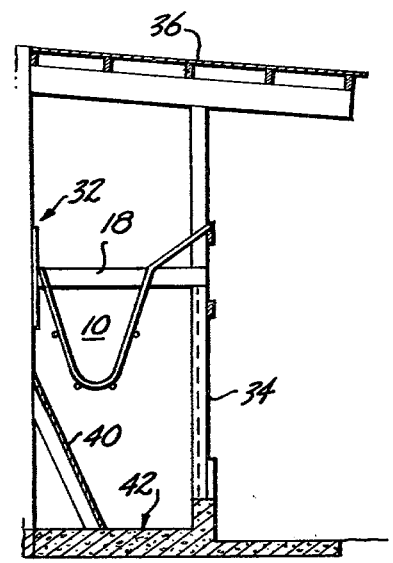
FIG. 2 is a schematic cross-sectional view of a manger suspended from an external wall of a farm building.

In FIG. 2, the manger 10 is suspended from bracket arms 18 attached at their inner ends to building external wall 32 and at their outer ends to stanchion posts 34. Roof 36 shelters the feeding station. Curb 38 discourages animals from penetrating into the space beneath manger 10. Deflector wall 40 slopes so as to direct falling hay outward as it descends to floor 42.

Figure 4:
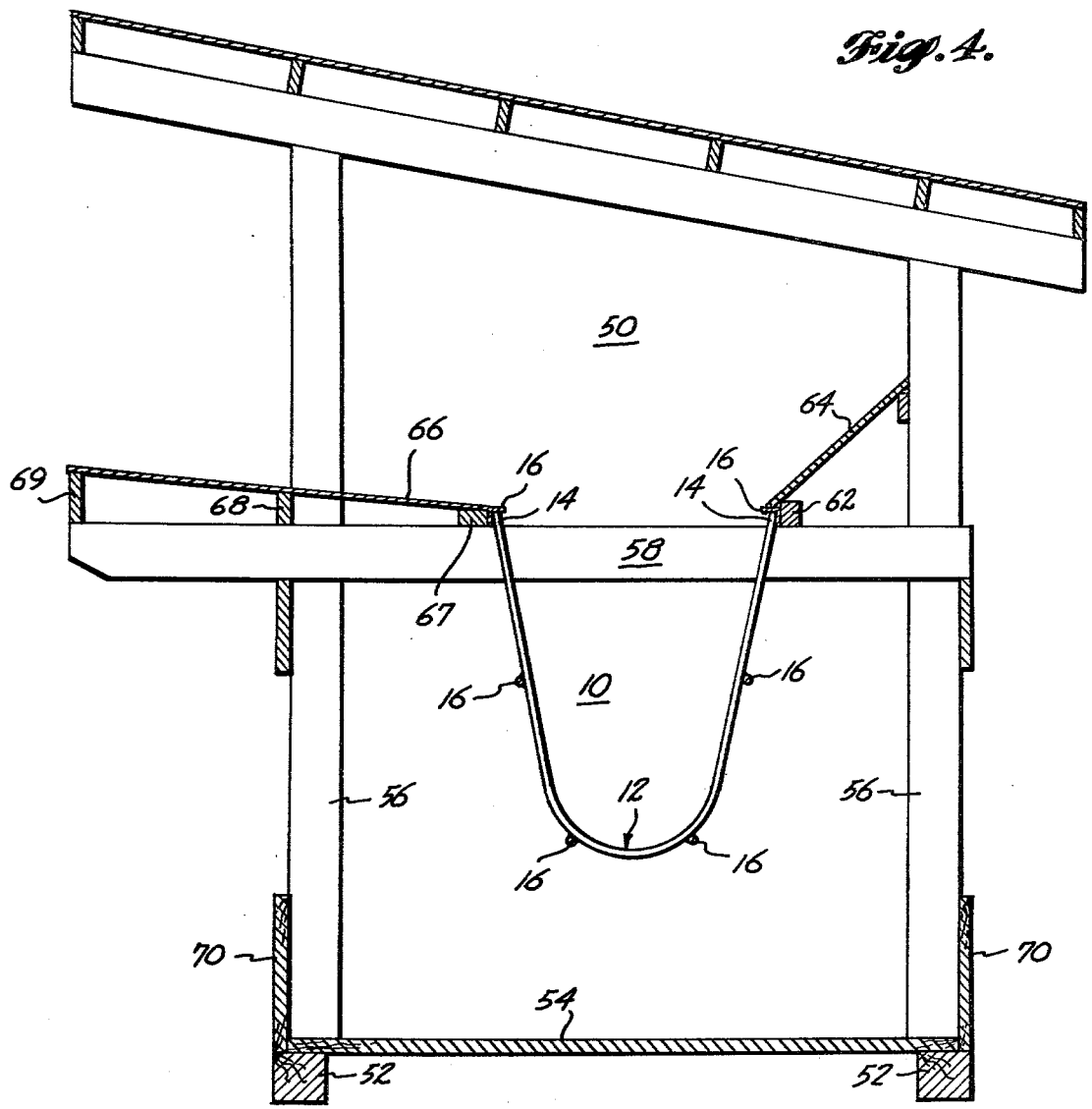
FIG. 4 is an enlarged cross-sectional view of a portable feeding station according to this invention.

In FIG. 4, manger 10 is installed in a portable feeding station structure 50 mounted on skids 52,52 having floor 54 thereover. Posts 56,56 support joists 58 and roof 60. The manger side rails 16 cross joists 58 to suspend the manger as shown in enlarged detail in FIG. 5. Longitudinal member 62, atop joists 58, supports the lower edge of deflector fender 64. Likewise, the hay storage deck 66 is supported by longitudinal beams 67,68,69 resting on joists 58. Feeding can occur from either side of structure 50; therefore each side has a curb 70.

The portable structure 50 being mounted on skids may be pushed or dragged from yard to yard or, in numbers, be arranged and rearranged as desired.

Shown herein are typical feeding station installations in accordance with this invention. Variations and modifications will be apparent and readily recognizable to those skilled in the pertinent art. All such as fall within the spirit and scope of the following claims liberally construed are intended to be protected by this patent.

I claim:

1. In an animal feeding system:
   a hay feeding station,
   elevated hay feeder apparatus located at said station, comprising:
   (a) an aligned and integrated plurality of laterally spaced-apart, U-shaped bar-like members attached to longitudinal bar means forming an upwardly open, openwork manger for hay,
   (b) a mow suspending a side of said manger at such height above the floor or ground level that feeding animals tend to raise their heads to pull hay from the lower portion of said container between said U-shaped members, said manger having an upstanding fender opposite said mow,
   (c) means permitting access to said elevated hay feeder apparatus from below, whereby hay placed in said apparatus may be consumed, and
   (d) curb means at said station extending approximately the length of and being located beneath the proximate margin of said manger relative to feeding animals whereby said curb means may be contacted by the front legs of animals tending to intrude underneath the manger and operable to discourage them from occupying and soiling the space beneath the said manger.

* * * * *